(12) United States Patent
Dai et al.

(10) Patent No.: US 8,929,095 B2
(45) Date of Patent: Jan. 6, 2015

(54) CABLE MANAGEMENT APPARATUS

(71) Applicants: Hong Fu Jin Precision Industry (ShenZhen) Co., Ltd., Shenzhen (CN); Hon Hai Precision Industry Co., Ltd., New Taipei (TW)

(72) Inventors: Ju-Wen Dai, Shenzhen (CN); Xin-Hu Gong, Shenzhen (CN); Wen-Tang Peng, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/144,369

(22) Filed: Dec. 30, 2013

(65) Prior Publication Data
US 2014/0110540 A1    Apr. 24, 2014

Related U.S. Application Data

(62) Division of application No. 13/195,034, filed on Aug. 1, 2011, now Pat. No. 8,659,914.

(30) Foreign Application Priority Data

Jun. 10, 2011   (CN) .......................... 2011 1 0155680

(51) Int. Cl.
*H02B 1/01* (2006.01)
*H02G 11/00* (2006.01)

(52) U.S. Cl.
CPC .................................. *H02G 11/006* (2013.01)
USPC ........................................... 361/825; 361/756

(58) Field of Classification Search
USPC ........... 361/825–827, 756, 727; 174/50, 68.3, 174/69, 99 R, 101; 211/69
See application file for complete search history.

(56) References Cited

U.S. PATENT DOCUMENTS

| 5,657,204 A * | 8/1997 | Hunt .............................. 361/752 |
| 2007/0212010 A1* | 9/2007 | Caveney ........................ 385/135 |
| 2008/0029472 A1* | 2/2008 | Herring et al. ................ 211/171 |
| 2012/0325989 A1* | 12/2012 | Huang et al. .................. 248/201 |

* cited by examiner

*Primary Examiner* — Hung S Bui
(74) *Attorney, Agent, or Firm* — Novak Druce Connolly Bove + Quigg LLP

(57) ABSTRACT

A cable management apparatus for managing a cable includes a mounting bracket slidably receiving the cable and fixing a rear end of the cable, a sliding bar slidably connected to the front end of the cable, and a rotating arm rotatably mounted to the mounting bracket and engaging with the cable. The sliding bar defines a guiding slot, which includes a driving portion extending slantingly relative to a sliding direction of the sliding bar. The rotating arm includes a rod slidably received in the guiding slot of the sliding bar. By sliding the sliding bar forward or rearward, the rod of the rotating arm slides along the driving portion of the guiding slot to rotate the rotating arm forward to stretch the cable or rotate the rotating arm rearward to wind up the cable.

3 Claims, 8 Drawing Sheets

CABLE MANAGEMENT APPARATUS

CROSS REFERENCE TO RELATED APPLICATIONS

This application is a divisional application of U.S. patent application, entitled "CABLE MANAGEMENT APPARATUS AND CABLE MODULE", with application Ser. No. 13/195,034, filed on Aug. 1, 2011, which claims foreign priority based on Chinese Patent application No. 201110155680.0, filed in China on Jun. 10, 2011. The contents of the above-referenced applications are hereby incorporated by reference.

BACKGROUND

1. Technical Field

The present disclosure relates to a cable management apparatus.

2. Description of Related Art

An electronic device, such as a server, generally includes a power module to distribute electrical power to components of the electronic device. For easy manipulation, the power module is mounted to a chassis of the server, accessible from a front end of the chassis, and connected to a power source with a cable extending out of the chassis. However, the cable may interfere with the components in the chassis if not properly arranged.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references can mean "at least one."

Figure 1:
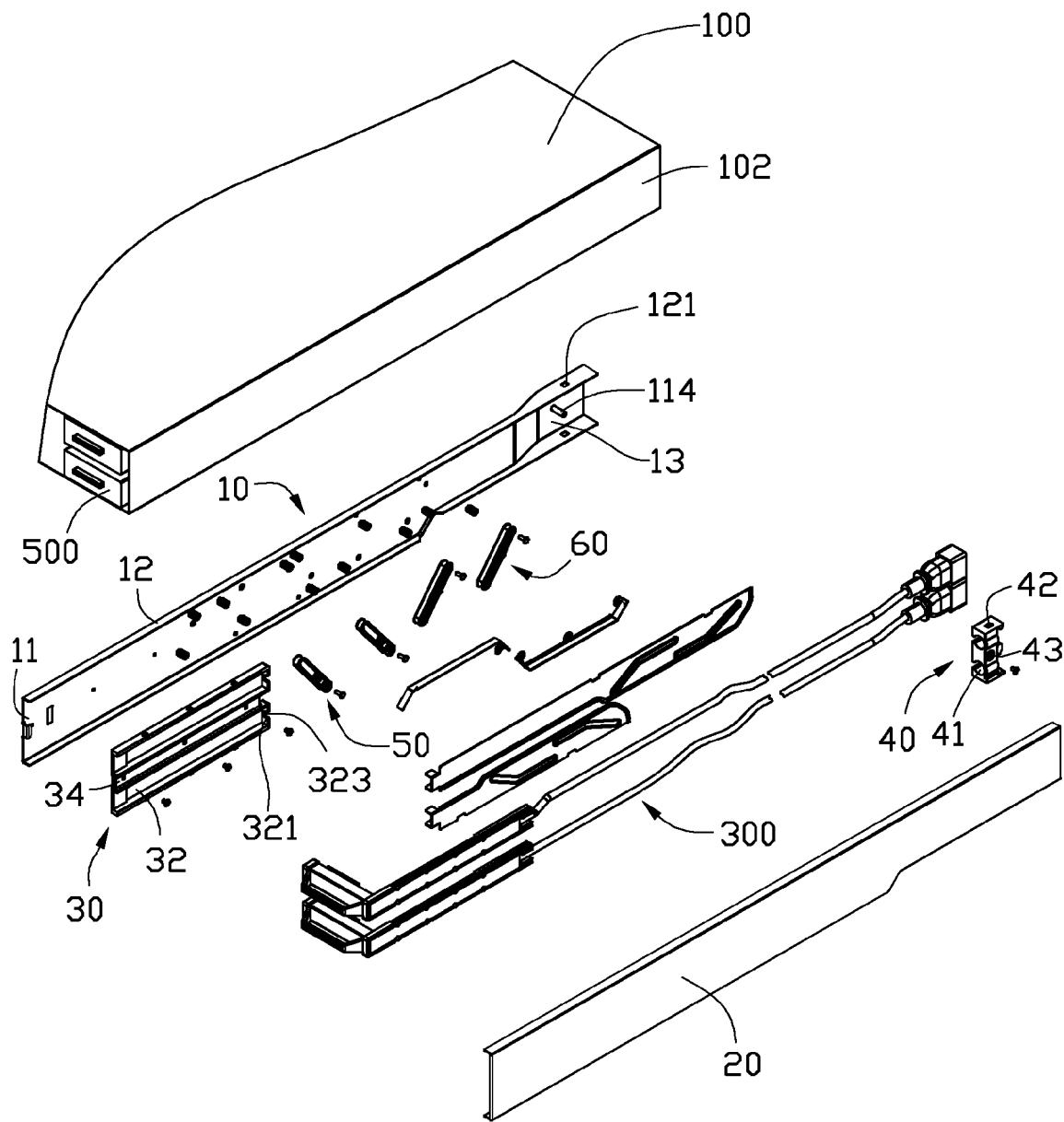
FIG. 1 is an exploded, isometric view of an embodiment of a cable management apparatus, two cables, and a chassis, the cable management apparatus including a mounting bracket, a cover, a guiding rail, a retaining member, and two cable coiling mechanisms.

Referring to FIG. 1, an exemplary embodiment of a cable management apparatus is mounted to a chassis 100 of a server, to manage two cables 300.

The chassis 100 includes a sidewall 102. Two power modules 500 are mounted in the chassis 100. The power modules 500 are arranged at a front end of the chassis 100, and abut the sidewall 102.

Figure 2:
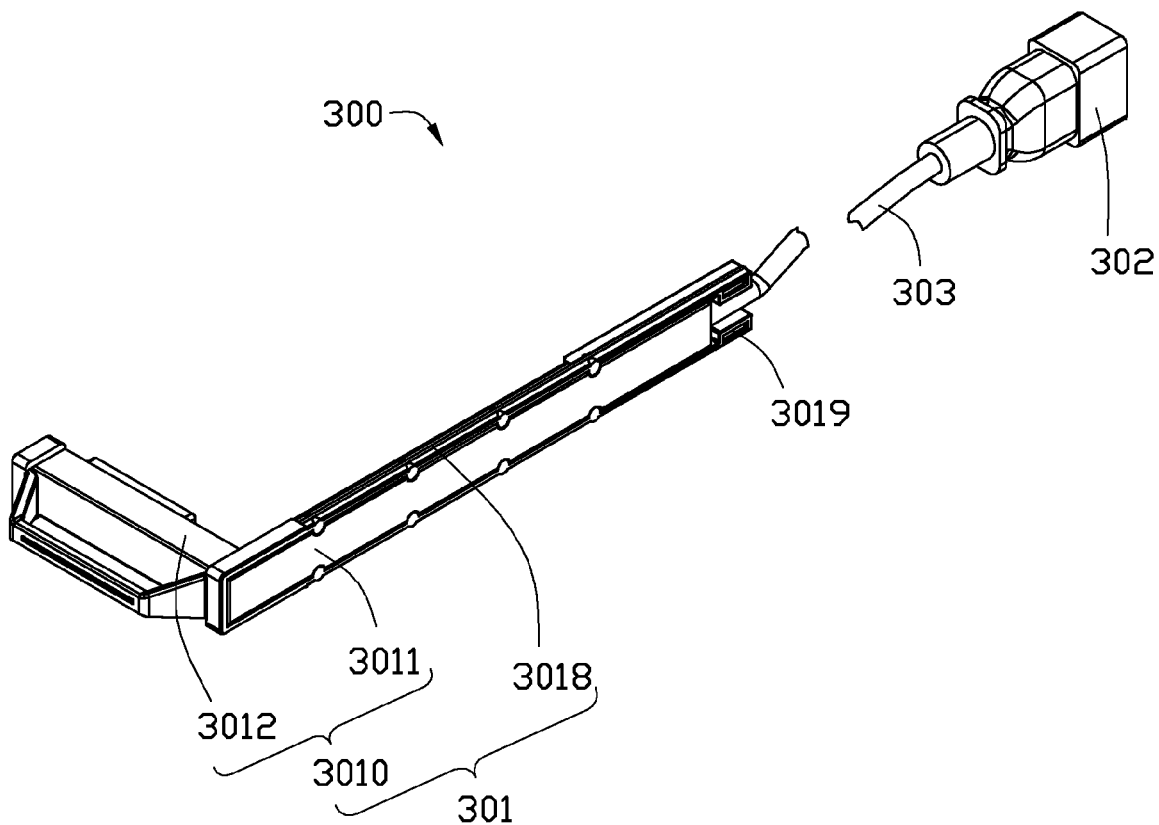
FIG. 2 is an enlarged view of one of the cables of FIG. 1.

Referring to FIG. 2, each of the cables 300 includes a cable body 303, and a first connector 301 and a second connector 302 connected to opposite ends of the cable body 303. The first connector 301 includes a substantially L-shaped connector body 3010 and a jacket 3018. The connector body 3010 includes an elongated portion 3011 extending from the cable body 303, and a coupling portion 3012 extending in a substantially perpendicular manner from a distal end of the elongated portion 3011 opposite to the second connector 302. The jacket 3018 is fixed to and sleeved on the elongated portion 3011. Two assembling holes 3019 are defined in an end of the jacket 3018 opposite to the coupling portion 3012.

Referring to FIG. 1, the cable management apparatus includes a mounting bracket 10, a cover 20, a guiding rail 30, a retaining member 40, and two cable coiling mechanisms 50, and 60.

The mounting bracket 10 includes a side plate 11 and two flanges 12 substantially extending from a top and a bottom sides of the side plate 11, respectively. The side plate 11 defines a plurality of fixing holes (not labeled), to mount the guiding rail 30, the retaining member 40, and the cable coiling mechanisms 50 and 60 to the mounting bracket 10. The side plate 11 defines a dented portion 14 adjacent to a rear end of the side plate 11. The dented portion 14 and the flanges 12 cooperatively bound a receiving space 13. An inner-threaded standoff 114 extends from the side plate 11 in the dented portion 14. Each of the flanges 12 defines a securing hole 121 aligned with the standoff 114.

The cover 20 is shaped to mate with the mounting bracket 10.

The guiding rail 30 includes two substantially U-shaped slide passages 32 substantially parallel to each other, and a mounting portion 34 connected between the slide passages 32. A block piece 321 extends from a rear end of each of the slide passages 32. Each of the block pieces 321 defines a notch 323.

The retaining member 40 defines two accommodating rooms 41. The top side and the bottom side of the retaining member 20 each form a securing tab 42. A through hole 43 is defined in a middle of the retaining member 40.

Figure 3:
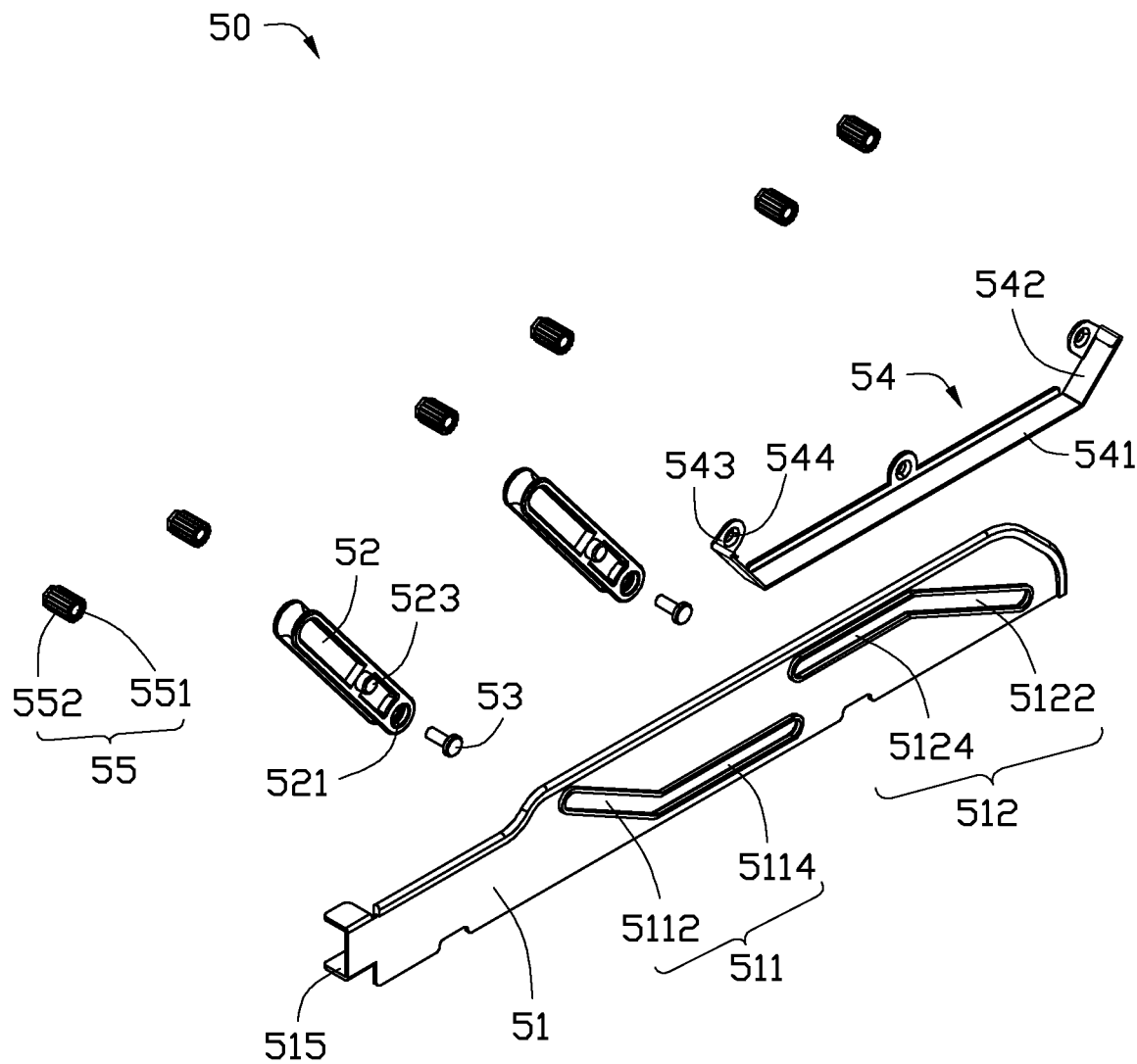
FIG. 3 is an enlarged view of one of the cable coiling mechanism of FIG. 1.

Referring to FIG. 3, the cable coiling mechanism 50 includes a sliding bar 51, two rotating arms 52, two shafts 53, a positioning member 54, and a plurality of guiding members 55.

The sliding bar 51 defines a front guiding slot 511, and a rear guiding slot 512. The front guiding slot 511 includes a driving portion 5112 slantingly extending down and rearwards, and an extending portion 5114 extending rearwards from a rear end of the driving portion 5112. The rear guiding slot 512 includes a driving portion 5122 substantially parallel to the driving portion 5112, and an extending portion 5124 extending forwards from a front end of the driving portion 5122, substantially parallel to the extending portion 5114. The sliding bar 51 includes two tabs 515 arranged at a front end of the sliding bar 51. A pivot hole 521 is defined in a first end of each of the rotating arms 52. Each of the rotating arms 52 includes a rod 523 extending from a middle of the rotating arm 52. The positioning member 54 includes a bar-shaped abutting portion 541, and two side portions 542 slantingly extending from opposite ends of the abutting position 541. A plurality of retaining ears 543, each defining a securing hole 544, is respectively formed on the abutting portion 541 and the side portions 542. Each of the guiding members 55 includes a pin 551 and a sleeve 552 rotatably fitting about the pin 551.

The cable coiling mechanism 60 is substantially similar to the cable coiling mechanism 50, and correspondingly includes a sliding bar, two rotating arms, two shafts, a positioning member, and a plurality of guiding members, which are structurally similar to the sliding bar 51, the rotating arms 52, the shafts 53, the positioning member 54, and the guiding members 55. Details description of the cable coiling mechanism 60 is omitted.

Figure 4:
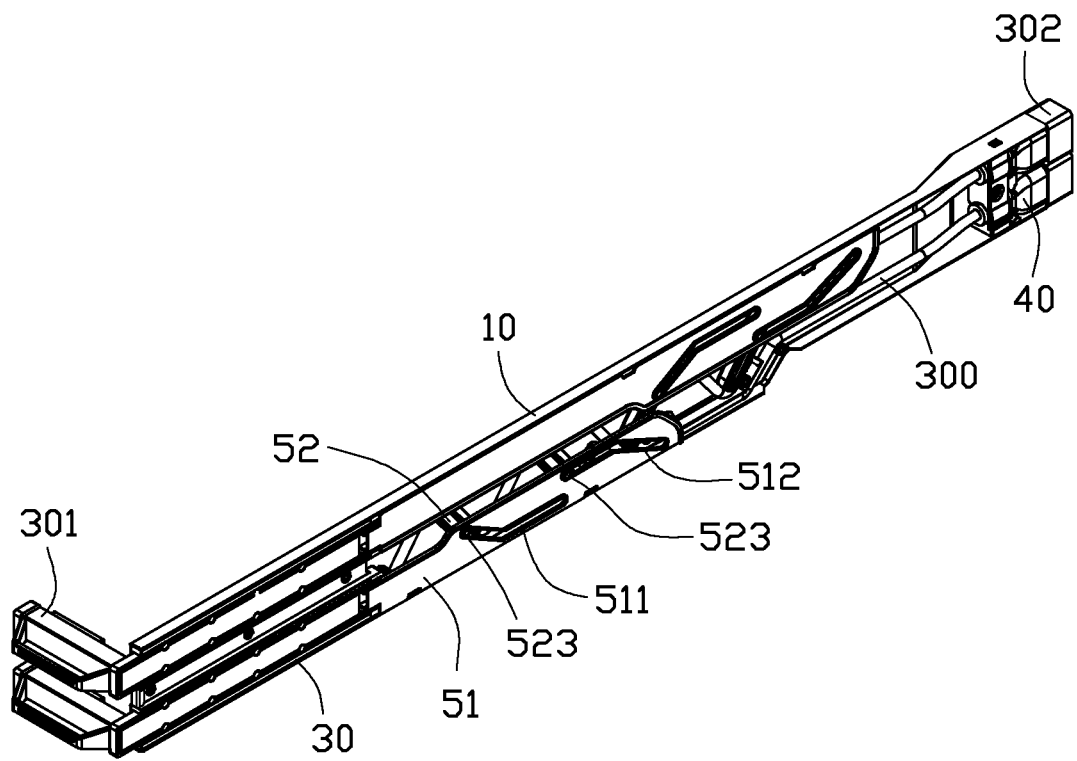
FIG. 4 is an assembled view of the cables and the cable management apparatus of FIG. 1, with the cover of the cable management apparatus being omitted.
Figure 5:
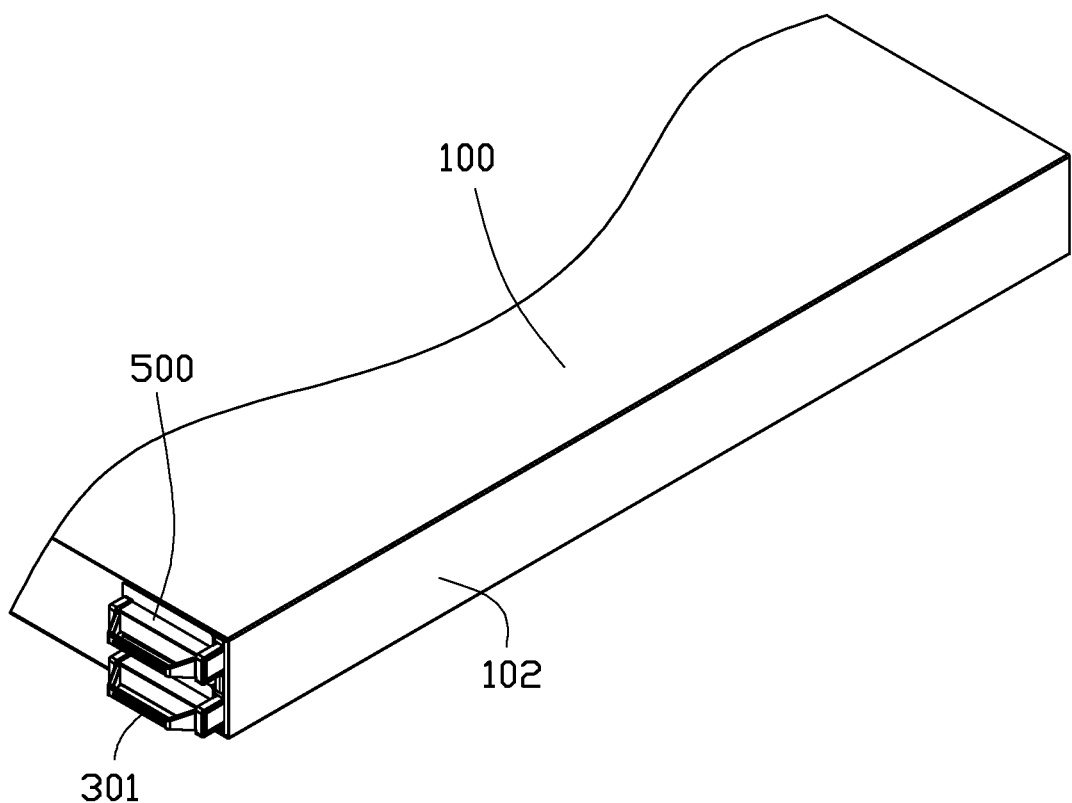
FIG. 5 is an assembled view of FIG. 1.
Figure 6:
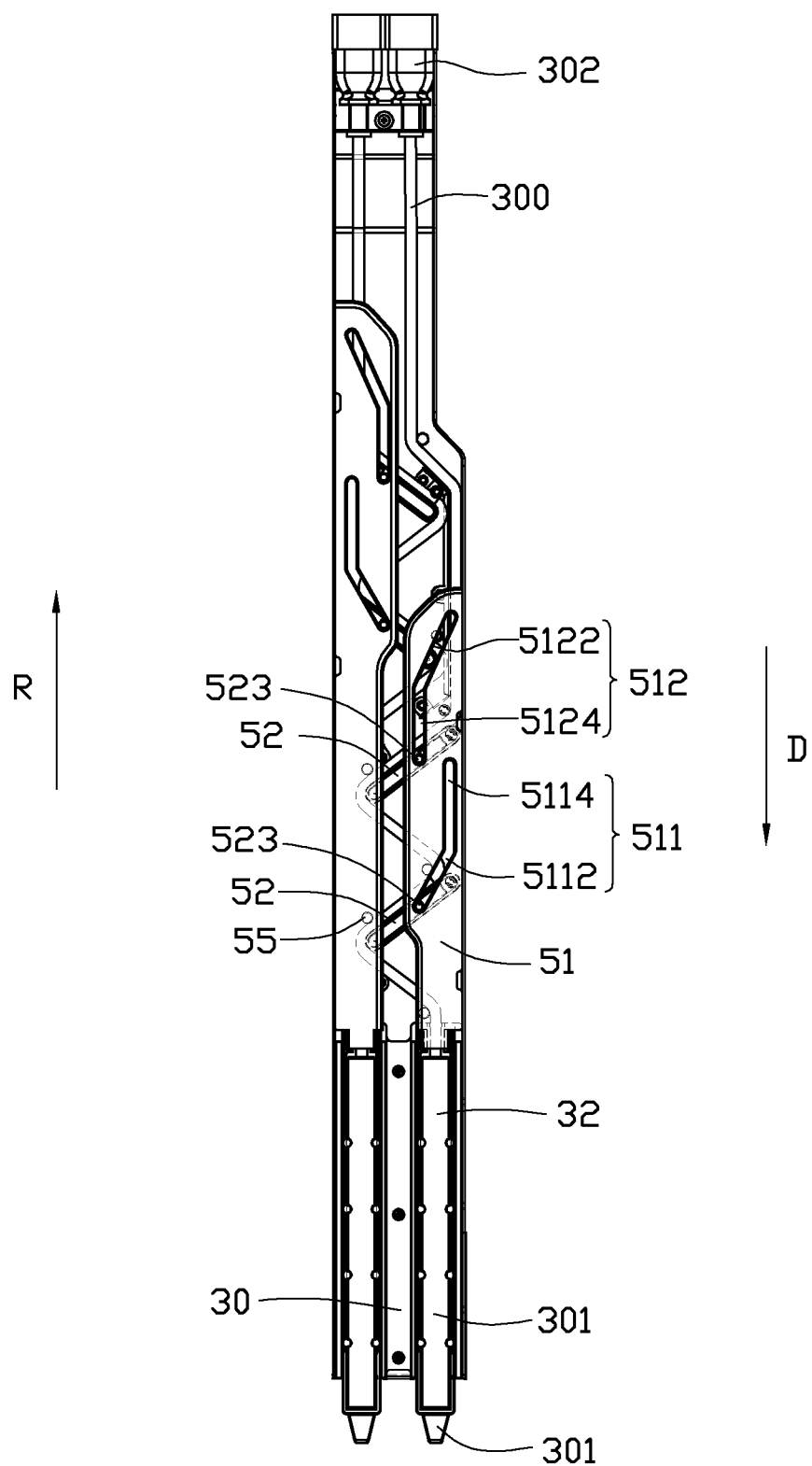
FIGS. 6-8 are side plan views of FIG. 4, showing the cable in different states, respectively.

Referring to FIGS. 4 to 6, in assembly, two shafts 53 respectively rotatably extend through the pivot holes 521 of the rotating arms 52, and is fixed to the corresponding fixing holes of the mounting bracket 10. Therefore, the rotating arms 52 are rotatably mounted to the mounting bracket 10, and are spaced from each other in a lengthwise direction of the mounting bracket 10. The guiding rail 30 and the positioning member 54 are secured to the mounting bracket 10 with rivets or screws. The guiding rail 30 is adjacent to a front end of the mounting bracket 10, with the slide passages 32 parallel to the lengthwise direction of the mounting bracket 10. The positioning member 54 is adjacent to a bottom of the mounting bracket 10, with the abutting portion 541 substantially parallel to the lengthwise direction of the mounting bracket 10. The pins 551 of the guiding members 55 are fixed to the corresponding fixing holes of the mounting bracket 10. Each of the rotating arms 52 is arranged between two neighboring guiding members 55.

The cable coiling mechanism 60 is mounted to the mounting bracket 10 above the cable coiling mechanism 50, in a same way like the cable coiling mechanism 50. The orientation of the sliding bar, the rotating arms and the positioning member of the cable coiling mechanism 60 is reverse to the orientation of the sliding bar 51, the rotating arms 52, and the positioning member 54.

In assembly of one of the cables 300, the elongated portion 3011 is received in a corresponding one of the slide passages 32, with the first connector 301 abutting against the corresponding block piece 321. The cable body 303 extends through the notch 323 of the corresponding block piece 321, located between the rotating arms 30 and the guiding members 55. The cable body 303 also abuts against the abutting portion 541 of the positioning member 54, sandwiched between the abutting portion 541 and the rotating members 30. The sliding bar 51 is slidably mounted to the mounting bracket 10. The tabs 515 are correspondingly engaged in the corresponding assembling holes 3019 of the first connector 301. The rods 523 of the rotating arms 52 are correspondingly slidably engaged in the front and rear guiding slots 511 and 512.

The ends of the second connectors 302 connected to the cable bodies 303 are received in the corresponding accommodating rooms 41 of the retaining member 40. The retaining member 40 is accommodated in the receiving space 13 of the mounting bracket 10. The through hole 43 fits about the standoff 114. The securing tabs 42 are engaged in the securing hole 121. A screw is extended through the through hole 43 and fastened in the standoff 114 to mount the retaining member 40 to the mounting bracket 10, thereby fixing the second connector 302 to the mounting bracket 10.

The cover 20 is mounted to the mounting bracket 10 to enclose the cables 300 with the mounting bracket 10. A module with the cable management apparatus and the cables 300 is mounted in the chassis 100, adjacent to the sidewall 102. The first connectors 301 are coupled to the corresponding power modules 500.

Figure 7:
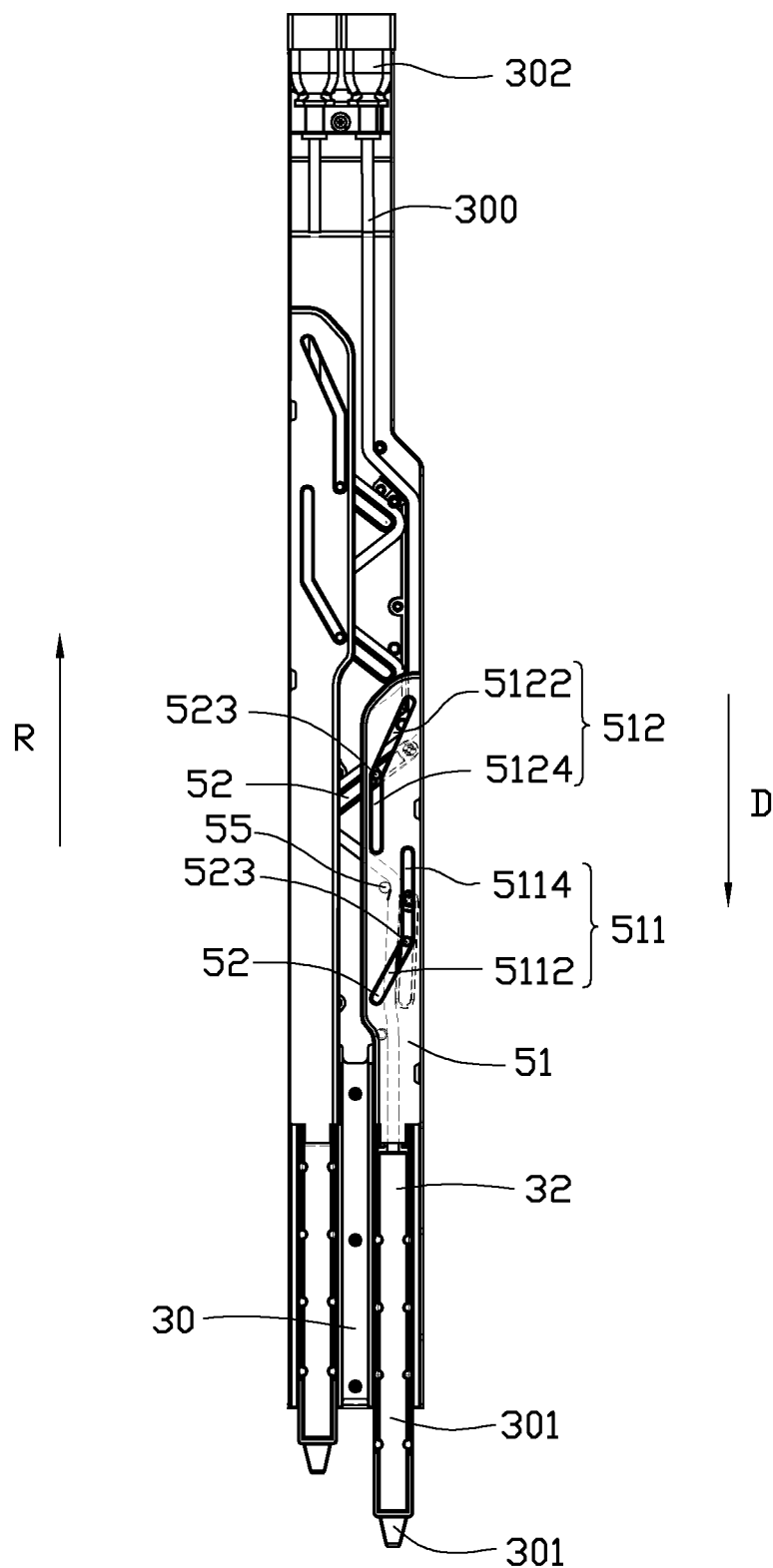
Figure 8:
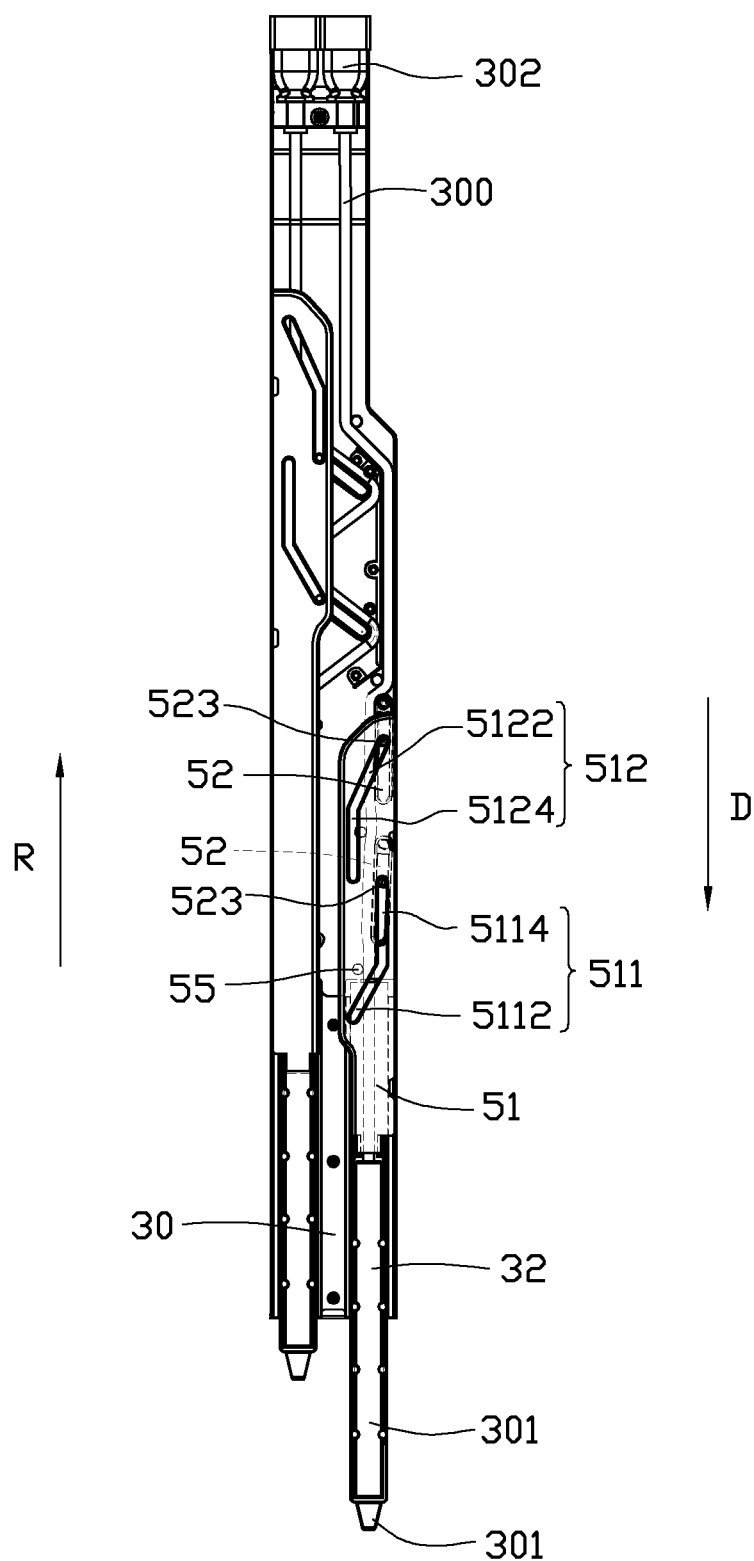

Referring to FIGS. 6 to 8, how the cable management apparatus works is explained by describing moving process of the cable 300 related to the cable coiling mechanism 50 as below.

To uncoil the cable 300, the first connector 301 is driven forward in a direction indicated by arrow D. The elongated portion 3011 of the first connector 301 slides forward in the corresponding sliding passage 32 of the guiding rail 30, to make the sliding bar 51 slide forward. With the sliding bar 51, and the rods 523 of the rotating arms 52 sliding in the corresponding front and rear guiding slots 511 and 512. Because the driving portion 5112 of the front guiding slot 511 is slanting toward the sliding direction of the sliding bar 51, the sidewall bounding the driving portion 5112 pushes the rod 523 to rotate the corresponding rotating arm 52 down and forward to a releasing position, wherein the rotating arm 52 releases the cable body 303. Because the extending portion 5124 of the rear guiding slot 512 is parallel to the sliding direction of the sliding bar 51, the rotating arm 52 engaged with the rear guiding slot 512 is kept at a winding-up position, where the rod 523 slides in the extending portion 5124 and the rotating member raises the cable body 303.

Referring to FIG. 7, when the rod 523 engaged in the front guiding slot 511 slides into the extending portion 5114 of the front guiding slot 511, the rod 523 engaged in the rear guiding slot 512 slides into the driving portion 5122 of the rear guiding slot 512. Because the extending portion 5114 of the front guiding slot 511 is parallel to the sliding direction of the sliding bar 52, the sliding bar 52 can slide on without interference from the engagement of the front guiding slot 512 and the corresponding rotating arm 52. Because the driving portion 5122 of the rear guiding slot 512 is slanted toward the sliding direction of the sliding bar 52, the sidewall bounding the driving portion 5122 drives the rod 523 engaged with the rear guiding slot 512 to rotate the corresponding rotating arm 52 forward and down to a released position. Wherein the rotating arm 52 releases the cable body 303 to further release the cable body 303.

To wind up the cable body 303, the first connector 301 is slid rearward in a direction indicated by arrow R. The elongated portion 3011 of the first connector 301 slides rearward in the corresponding sliding passage 32 of the guiding rail 30, to make the sliding bar 51 slide rearward. With the rod 523 engaged in the rear guiding slot 512 slides along the driving portion 5122, the rod 523 is driven to rotate the corresponding rotating arm 52 rearward and up to the winding-up position to wind up the cable body 303. At the same time, the rod 523 engaged in the front guiding slot 511 slides in the extending portion 5114 to make sure the cable body 303 slide smoothly.

When the rod 523, engaged in the front guiding slot 511, slides into the extending portion 5114 of the front guiding slot 511, the rod 523, engaged in the rear guiding slot 512, slides into the driving portion 5122 of the rear guiding slot 512. The first connector 301 is further slid rearward to abut against the corresponding block piece 321. The rod 523 engaged in the front guiding slot 511 slides in the driving portion 5112 to rotate the corresponding rotating arm 52 rearward and up to the winding-up position to further wind up the cable body 303.

The sleeves 552 of the guiding members 55 can rotate and will not prevent the movement of the cable body 303.

Even though numerous characteristics and advantages of the embodiments have been set forth in the foregoing description, together with details of the structure and the functions of the embodiments, the disclosure is illustrative only, and changes may be made in details, especially in the matters of shape, size, and arrangement of parts within the principles of the embodiments to the full extent indicated by the broad general meaning of the terms in which the appended claims are expressed.

What is claimed is:

1. A cable management apparatus for managing a cable, the cable management apparatus comprising:
   a mounting bracket to receive the cable, and fix a rear end of the cable;
   a plurality of guiding members mounted to the mounting bracket;
   a sliding bar fixed to a front end of the cable, slidable forwards and rearwards relative to the mounting bracket, and defining a plurality of guiding slots, each of the guiding slots comprising a driving portion extending slantingly relative to a sliding direction of the sliding bar; and
   a plurality of rotating arms rotatably mounted to the mounting bracket, each of the rotating arms comprising a rod, the rod slidably engaged in a corresponding one of the guiding slots of the sliding bar;
   wherein each of the rotating arms is arranged between two neighboring guiding members to make the cable be sandwiched between the guiding members and the rotating arms; in response to the sliding bar sliding forwards, the rods slide along the driving portions of the corresponding guiding slots to rotate the corresponding rotating arms forwards to stretch the cable; in response to the sliding bar sliding rearwards, the rods slide in the driving portions of the corresponding guiding slots to rotate the corresponding rotating arms rearwards to wind up the cable.

2. The cable management apparatus of claim 1, further comprising a guiding rail secured to a front end of the mounting bracket, wherein the guiding rail defines a slide passage to slidably receive the cable.

3. The cable management apparatus of claim 1, further comprising a retaining member retained to the mounting bracket, wherein the retaining member defines an accommodating room to hold a rear end of the cable.

* * * * *